(12) United States Patent
Ferro

(10) Patent No.: US 11,163,434 B2
(45) Date of Patent: Nov. 2, 2021

(54) SYSTEMS AND METHODS FOR USING AUGMENTING REALITY TO CONTROL A CONNECTED HOME SYSTEM

(71) Applicant: Ademco Inc., Golden Valley, MN (US)

(72) Inventor: Philip J. Ferro, Setauket, NY (US)

(73) Assignee: Ademco Inc., Golden Valley, MN (US)

(*) Notice: Subject to any disclaimer, the term of this patent is extended or adjusted under 35 U.S.C. 154(b) by 0 days.

(21) Appl. No.: 16/256,748

(22) Filed: Jan. 24, 2019

(65) Prior Publication Data

US 2020/0241736 A1 Jul. 30, 2020

(51) Int. Cl.
| | |
|---|---|
| H04L 12/28 | (2006.01) |
| G06F 3/0488 | (2013.01) |
| G16Y 40/30 | (2020.01) |
| G06F 3/0484 | (2013.01) |
| H04L 29/08 | (2006.01) |
| G06T 19/00 | (2011.01) |
| G06F 3/01 | (2006.01) |

(52) U.S. Cl.
CPC ......... *G06F 3/04847* (2013.01); *G06F 3/01* (2013.01); *G06F 3/0488* (2013.01); *G06T 19/006* (2013.01); *H04L 12/2803* (2013.01); *H04L 67/12* (2013.01); *G16Y 40/30* (2020.01)

(58) Field of Classification Search
CPC ...... G06F 3/04847; G06F 3/01; G06F 3/0488; G06T 19/006; H04L 12/2803; H04L 67/12; H04L 12/282; G16Y 40/30; G06K 9/00671; G06K 2209/27

See application file for complete search history.

(56) References Cited

U.S. PATENT DOCUMENTS

| | | |
|---|---|---|
| 4,821,309 A | 4/1989 | Namekawa |
| 5,331,549 A | 7/1994 | Crawford, Jr. |
| 5,960,337 A | 9/1999 | Brewster et al. |
| 6,028,915 A | 2/2000 | McNevin |
| 6,031,836 A | 2/2000 | Haserodt |

(Continued)

FOREIGN PATENT DOCUMENTS

| | | |
|---|---|---|
| EP | 1970871 A2 | 9/2008 |
| EP | 2219163 A1 | 8/2010 |

(Continued)

OTHER PUBLICATIONS

Extended European Search Report from corresponding EP patent application 20152568.0, dated Jun. 9, 2020.

*Primary Examiner* — Yongjia Pan

(74) *Attorney, Agent, or Firm* — Fredrikson & Byron, P.A.

(57) ABSTRACT

Systems and methods for using augmented reality to control a connected home system are provided. Some methods can include receiving a video data stream from an IoT video device monitoring a region in which an IoT automation device is located within a field of view of the IoT video device, displaying the video data stream on a user interface device, overlaying a controlling graphic on top of a depiction of the IoT automation device in the video data stream displayed on the user interface device, receiving first user input identifying the controlling graphic via the video data stream displayed on the user interface device, and responsive to the first user input, initiating a change of state of the IoT automation device in the region.

6 Claims, 1 Drawing Sheet

(56) References Cited

U.S. PATENT DOCUMENTS

| | | | |
|---|---|---|---|
| 6,037,936 A * | 3/2000 | Ellenby | G01C 17/34 348/211.8 |
| 6,292,542 B1 | 9/2001 | Bilder | |
| 6,466,258 B1 | 10/2002 | Mogenis et al. | |
| 6,529,137 B1 | 3/2003 | Roe | |
| 7,026,926 B1 | 4/2006 | Walker, III | |
| 7,119,675 B2 | 10/2006 | Khandelwal et al. | |
| 7,145,462 B2 | 12/2006 | Dewing et al. | |
| 7,177,623 B2 | 2/2007 | Baldwin | |
| 7,542,428 B1 | 6/2009 | Johnson et al. | |
| 7,734,906 B2 | 6/2010 | Orlando et al. | |
| 7,884,734 B2 * | 2/2011 | Izadi | H04W 76/14 340/686.6 |
| 8,225,226 B2 * | 7/2012 | Skourup | G06F 3/011 715/771 |
| 8,314,683 B2 | 11/2012 | Pfeffer | |
| 8,345,665 B2 | 1/2013 | Vieri et al. | |
| 8,350,694 B1 | 1/2013 | Trundle et al. | |
| 8,400,548 B2 * | 3/2013 | Bilbrey | G06F 3/011 348/333.01 |
| 8,433,344 B1 | 4/2013 | Virga | |
| 8,473,619 B2 | 6/2013 | Baum et al. | |
| 8,478,844 B2 | 7/2013 | Baum et al. | |
| 8,489,063 B2 | 7/2013 | Petite | |
| 8,494,481 B1 | 7/2013 | Bacco et al. | |
| 8,538,374 B1 | 9/2013 | Haimo et al. | |
| 8,554,250 B2 * | 10/2013 | Linaker | G06Q 30/06 455/456.6 |
| 8,576,066 B2 | 11/2013 | Bivens et al. | |
| 8,600,338 B2 | 12/2013 | Perrott et al. | |
| 8,625,751 B2 | 1/2014 | Bruce et al. | |
| 8,630,820 B2 | 1/2014 | Amis | |
| 8,830,267 B2 * | 9/2014 | Brackney | G06Q 10/06 345/633 |
| 8,896,436 B1 | 11/2014 | Morehead | |
| 8,970,725 B2 * | 3/2015 | Mekenkamp | G06F 3/017 348/222.1 |
| 8,990,887 B2 | 3/2015 | Kocsis et al. | |
| 9,013,294 B1 | 4/2015 | Trundle | |
| 9,414,212 B2 | 8/2016 | Nokhoudian et al. | |
| 9,426,638 B1 | 8/2016 | Johnson | |
| 9,438,440 B2 * | 9/2016 | Burns | G01S 11/16 |
| 9,571,625 B2 * | 2/2017 | Kim | G06F 3/0488 |
| 9,640,005 B2 | 5/2017 | Geerlings et al. | |
| 9,727,132 B2 * | 8/2017 | Liu | G06F 3/017 |
| 9,875,643 B1 | 1/2018 | Sarna, II | |
| 10,142,421 B2 | 11/2018 | Mighdoll et al. | |
| 10,212,000 B1 * | 2/2019 | Irving, Jr. | G06F 3/0304 |
| 10,559,194 B2 * | 2/2020 | Jiang | H04W 4/70 |
| 10,602,046 B2 * | 3/2020 | Pan | G06K 9/00671 |
| 10,613,729 B2 * | 4/2020 | Cohrt | G06T 19/006 |
| 2001/0016806 A1 | 8/2001 | Ronen | |
| 2002/0053978 A1 | 5/2002 | Peterson et al. | |
| 2003/0012344 A1 | 1/2003 | Agarwal et al. | |
| 2003/0151507 A1 | 8/2003 | Andre et al. | |
| 2004/0103431 A1 | 5/2004 | Davenport et al. | |
| 2004/0145465 A1 | 7/2004 | Stults et al. | |
| 2004/0192250 A1 | 9/2004 | Hargett | |
| 2004/0239498 A1 | 12/2004 | Miller | |
| 2005/0222820 A1 | 10/2005 | Chung | |
| 2006/0015254 A1 | 1/2006 | Smith | |
| 2006/0125621 A1 | 6/2006 | Babich | |
| 2007/0008099 A1 | 1/2007 | Kimmel et al. | |
| 2007/0103294 A1 | 5/2007 | Bonecutter et al. | |
| 2007/0115108 A1 | 5/2007 | Martin et al. | |
| 2007/0210910 A1 | 9/2007 | Norstrom et al. | |
| 2007/0236381 A1 * | 10/2007 | Ouchi | G08C 17/00 341/176 |
| 2007/0262857 A1 | 11/2007 | Jackson | |
| 2008/0048861 A1 | 2/2008 | Naidoo et al. | |
| 2008/0098068 A1 | 4/2008 | Ebata | |
| 2008/0151795 A1 | 6/2008 | Shorty et al. | |
| 2008/0191857 A1 | 8/2008 | Mojaver | |
| 2008/0278311 A1 | 11/2008 | Grange et al. | |
| 2009/0005068 A1 | 1/2009 | Forstall et al. | |
| 2009/0265576 A1 | 10/2009 | Blum | |
| 2009/0294666 A1 | 12/2009 | Hargel | |
| 2009/0322511 A1 | 12/2009 | McKenna et al. | |
| 2009/0322523 A1 | 12/2009 | McKenna et al. | |
| 2010/0002845 A1 | 1/2010 | Zerillo et al. | |
| 2010/0030399 A1 | 2/2010 | Zellner et al. | |
| 2010/0045460 A1 | 2/2010 | Caler et al. | |
| 2010/0094636 A1 | 4/2010 | Becker et al. | |
| 2010/0325047 A1 | 12/2010 | Carlson et al. | |
| 2011/0046920 A1 | 2/2011 | Amis | |
| 2011/0071880 A1 | 3/2011 | Spector | |
| 2011/0105041 A1 * | 5/2011 | Maruyama | G08C 17/02 455/66.1 |
| 2011/0111728 A1 | 5/2011 | Ferguson et al. | |
| 2011/0157357 A1 * | 6/2011 | Weisensale | F24F 11/30 348/143 |
| 2011/0181443 A1 | 7/2011 | Gutierrez et al. | |
| 2012/0188072 A1 | 7/2012 | Dawes et al. | |
| 2012/0203379 A1 | 8/2012 | Sloo et al. | |
| 2012/0218102 A1 | 8/2012 | Bivens et al. | |
| 2013/0053063 A1 | 2/2013 | McSheffrey | |
| 2013/0141460 A1 | 6/2013 | Kane-Esrig et al. | |
| 2013/0173064 A1 | 7/2013 | Fadell et al. | |
| 2013/0204440 A1 | 8/2013 | Fadell et al. | |
| 2013/0257858 A1 | 10/2013 | Na et al. | |
| 2013/0264383 A1 * | 10/2013 | Ko | G05B 19/0426 235/375 |
| 2013/0295872 A1 | 11/2013 | Guday et al. | |
| 2013/0338839 A1 | 12/2013 | Rogers et al. | |
| 2014/0096084 A1 * | 4/2014 | Kwon | G06F 3/04842 715/835 |
| 2014/0098247 A1 * | 4/2014 | Rao | H04W 4/20 348/207.1 |
| 2014/0168262 A1 * | 6/2014 | Forutanpour | G06T 19/006 345/633 |
| 2014/0244001 A1 * | 8/2014 | Glickfield | H04L 67/16 700/33 |
| 2014/0253321 A1 | 9/2014 | Srinivasan et al. | |
| 2014/0266669 A1 | 9/2014 | Fadell et al. | |
| 2014/0292807 A1 * | 10/2014 | Raffa | G06T 19/006 345/633 |
| 2014/0316581 A1 | 10/2014 | Fadell et al. | |
| 2014/0337921 A1 | 11/2014 | Hanna, Jr. et al. | |
| 2014/0368601 A1 | 12/2014 | deCharms | |
| 2015/0028746 A1 * | 1/2015 | Temple | G08C 17/02 315/129 |
| 2015/0077282 A1 | 3/2015 | Mohamadi | |
| 2015/0111525 A1 | 4/2015 | Crockett et al. | |
| 2015/0130957 A1 * | 5/2015 | Berelejis | H04L 67/12 348/211.1 |
| 2015/0228139 A1 | 8/2015 | Geerlings et al. | |
| 2015/0279187 A1 | 10/2015 | Kranz | |
| 2015/0281656 A1 | 10/2015 | Chien et al. | |
| 2015/0288819 A1 | 10/2015 | Brown et al. | |
| 2015/0302674 A1 | 10/2015 | Kuruba et al. | |
| 2015/0317809 A1 | 11/2015 | Chellappan et al. | |
| 2015/0324107 A1 | 11/2015 | Van Dijkman et al. | |
| 2015/0339031 A1 | 11/2015 | Zeinstra et al. | |
| 2015/0347850 A1 * | 12/2015 | Berelejis | G06K 9/00671 345/633 |
| 2015/0370615 A1 | 12/2015 | Pi-Sunyer | |
| 2016/0019763 A1 | 1/2016 | Raji et al. | |
| 2016/0029190 A1 | 1/2016 | Rattner | |
| 2016/0037319 A1 | 2/2016 | Hafeman | |
| 2016/0098305 A1 | 4/2016 | Bucsa et al. | |
| 2016/0117913 A1 | 4/2016 | Sharma et al. | |
| 2016/0179087 A1 | 6/2016 | Lee | |
| 2016/0180699 A1 | 6/2016 | Cote | |
| 2016/0203648 A1 * | 7/2016 | Bilbrey | G06F 1/1694 348/333.02 |
| 2016/0224123 A1 * | 8/2016 | Antoniac | G06F 3/017 |
| 2016/0274762 A1 * | 9/2016 | Lopez | G06T 19/006 |
| 2016/0275022 A1 | 9/2016 | Piel et al. | |
| 2016/0286033 A1 | 9/2016 | Frenz et al. | |
| 2016/0313750 A1 | 10/2016 | Frenz et al. | |
| 2016/0323548 A1 | 11/2016 | Khot et al. | |
| 2016/0335423 A1 | 11/2016 | Beals | |

(56) References Cited

U.S. PATENT DOCUMENTS

| | | | |
|---|---|---|---|
| 2016/0335981 A1* | 11/2016 | Koo | G06F 3/012 |
| 2017/0010783 A1 | 1/2017 | Beattie | |
| 2017/0034295 A1 | 2/2017 | Verna et al. | |
| 2017/0108838 A1* | 4/2017 | Todeschini | H05B 47/125 |
| 2017/0169688 A1 | 6/2017 | Britt et al. | |
| 2017/0191695 A1 | 7/2017 | Bruhn et al. | |
| 2017/0222884 A1* | 8/2017 | Denneler | H04L 41/22 |
| 2017/0270715 A1* | 9/2017 | Lindsay | G06T 7/70 |
| 2017/0364747 A1* | 12/2017 | Ekambaram | G06K 9/00671 |
| 2018/0102045 A1 | 4/2018 | Simon | |
| 2018/0137725 A1 | 5/2018 | Acera et al. | |
| 2018/0160260 A1 | 6/2018 | Meganathan | |
| 2018/0177031 A1* | 6/2018 | Yoo | H05B 47/19 |
| 2018/0199179 A1 | 7/2018 | Rauner | |
| 2018/0204385 A1* | 7/2018 | Sarangdhar | G08C 17/02 |
| 2018/0239425 A1* | 8/2018 | Jang | G06T 19/006 |
| 2018/0365495 A1 | 12/2018 | Laycock et al. | |
| 2018/0365898 A1* | 12/2018 | Costa | G06F 3/0304 |
| 2019/0068393 A1* | 2/2019 | Lee | G06F 3/0481 |
| 2019/0114061 A1* | 4/2019 | Daniels | G06F 3/04815 |
| 2019/0171170 A1* | 6/2019 | Becea | G05B 19/042 |
| 2019/0208024 A1* | 7/2019 | Jablonski | G06F 40/284 |
| 2019/0212901 A1* | 7/2019 | Garrison | G09G 5/12 |
| 2019/0340819 A1* | 11/2019 | Chandrashekarappa | G06F 3/04842 |
| 2019/0347916 A1 | 11/2019 | Wild et al. | |
| 2019/0392604 A1* | 12/2019 | Keen | G06T 7/70 |
| 2020/0005542 A1* | 1/2020 | Kocharlakota | G06F 3/0304 |

FOREIGN PATENT DOCUMENTS

| | | | | |
|---|---|---|---|---|
| EP | 2987269 B1 * | 7/2018 | | H04L 12/281 |
| EP | 3429133 A1 * | 1/2019 | | G06F 3/011 |
| WO | 2007100553 A2 | 9/2007 | | |
| WO | 2013175076 A1 | 11/2013 | | |
| WO | 2014124497 A1 | 8/2014 | | |
| WO | 2014169232 A1 | 10/2014 | | |

* cited by examiner

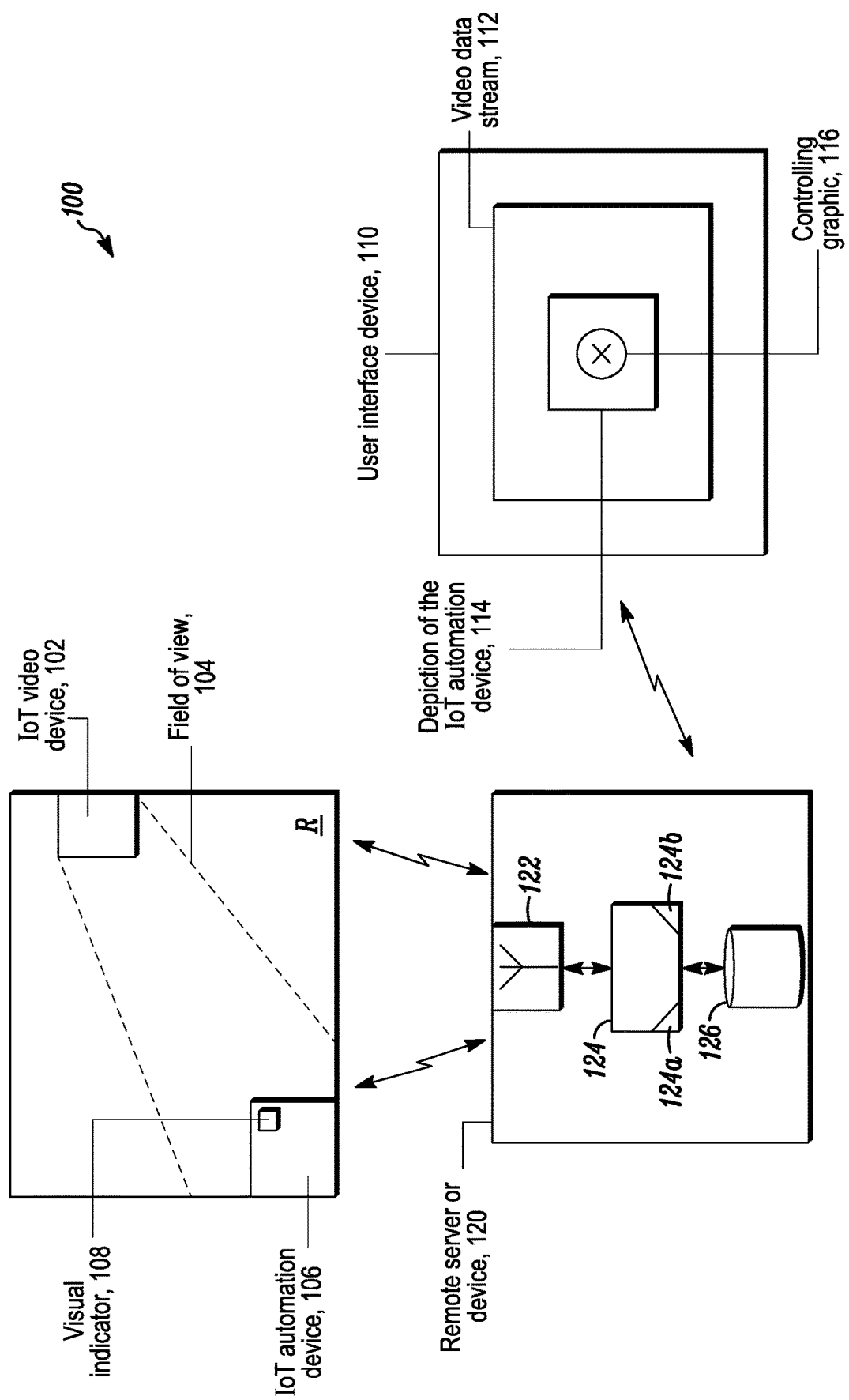

SYSTEMS AND METHODS FOR USING
AUGMENTING REALITY TO CONTROL A
CONNECTED HOME SYSTEM

FIELD

The present invention relates generally to connected home systems. More particularly, the present invention relates to systems and methods for using augmented reality to control connected home systems.

BACKGROUND

Systems and methods to control Internet-of-Things (IoT) automation devices in a connected home system, such as lights, switches, locks, and thermostats, are known. For example, such systems and methods can include a device control page in a mobile or web application displaying identifications of the IoT automation devices to a user in a list consecutively or in groups based on types or locations of the IoT automation devices, and the device control page receiving user input to control one of the IoT automation devices.

Systems and methods to view a video data stream captured by an IoT video device in the connected home system are also known. For example, such systems and methods can include a video page in the mobile or web application displaying the video data stream to the user.

However, if the user wishes to confirm that the one of the IoT automation devices changed state pursuant to the user input entered into the device control page outside of feedback provided by the device control page, then the user must navigate to the video page to view the video data stream and the one of the IoT automation devices captured therein. That is, the user must switch from the device control page to the video page, thereby creating a less than desirable user experience.

In view of the above, there is a continuing, ongoing need for improved systems and methods.

BRIEF DESCRIPTION OF THE DRAWINGS

FIG. 1 is a block diagram of a connected system in accordance with disclosed embodiments.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for using augmented reality to control a connected home system, thereby enhancing a user experience when interacting with the connected home system. For example, the connected home system can include an IoT video device, such as a camera, and an IoT automation device (or a plurality of automation devices), such as a light, a switch, a lock, or a thermostat. The IoT video device can monitor a region in which the connected home system is installed, and the IoT automation device can be located within a field of view of the IoT video device so that a depiction of the IoT automation device can be displayed in a video data stream captured by the IoT video device.

In accordance with disclosed embodiments, systems and methods disclosed herein can overlay controlling graphics on top of the video data stream when displaying the video data stream on a user interface device, such as in a mobile or web application. For example, in some embodiments, systems and method disclosed herein can display the controlling graphics on top of the video data stream responsive to first user input, such as a user touching the user interface device displaying the video data stream for a predetermined period of time.

Then, systems and methods disclosed herein can receive second user input via a portion of the controlling graphics overlaid on the depiction of the IoT automation device displayed in the video data stream, initiate a change of state of the IoT automation device in the region responsive to the second user input, and display the depiction of the IoT automation device with the state changed in the video data stream. Accordingly, systems and methods disclosed herein can both receive the second user input to change the state of the IoT automation device and provide visual confirmation displaying the IoT automation device with the state changed via a single page or screen of the user interface device and without navigating to multiple pages or screens of the user interface device. In some embodiments, the second user input can include the user touching the portion of the user interface device displaying the controlling graphics over the depiction of the IoT automation device for the predetermined period of time.

In some embodiments, responsive to the second user input and prior to initiating the change of state of the IoT device, systems and methods disclosed herein can display details for the portion of the controlling graphics receiving the second user input. For example, the portion of the controlling graphics receiving the second user input can include an identifier of a thermostat in the region. In these embodiments, responsive to the second user input, systems and methods disclosed herein can display a temperature of the region and up and down arrows to control the thermostat overlaid on a depiction of the thermostat displayed in the video data stream, receive third user input via the up and down arrows to adjust the thermostat up or down, and initiate adjusting the thermostat responsive to the third user input. Alternatively, the portion of the controlling graphics receiving the second user input can include an identifier of a light with a dimmer in the region. In these embodiments, responsive to the second user input, systems and methods disclosed herein can display a slide bar to control a brightness of the dimmer overlaid on a depiction of the light displayed in the video data stream, receive third user input via the slide bar to adjust the brightness of the dimmer, and initiate adjusting the dimmer responsive to the third user input. Accordingly, systems and methods disclosed herein can both receive the third user input to change the state of the IoT automation device and provide visual confirmation displaying the IoT automation device with the state changed via the single page or screen of the user interface device and without navigating to multiple pages or screens of the user interface device.

In some embodiments, the IoT automation device can include an emitter, such as an infrared LED. To enroll the IoT automation device with the IoT video device for control via the video data stream, systems and methods disclosed herein can instruct the IoT automation device to transmit a visual or non-visual signal to the IoT video device. In some embodiments, the visual or non-visual signal can include a unique signature therein that can identify the IoT automation device and capabilities of the IoT automation device.

The IoT video device can capture the visual or non-visual signal, and responsive thereto, systems and methods disclosed herein can identify and save a location of the IoT automation device within the field of view of the IoT video device. Then, systems and methods disclosed herein can match the location of the IoT automation device within the field of view of the IoT video device with a location for the portion of the controlling graphics to be overlaid on the depiction of the IoT automation device displayed in the video data stream. When the user interface device receives the second user input, systems and methods disclosed herein can correlate a touch point of the user interface device receiving the second user input with the location of the portion of the controlling graphics overlaying the depiction of the IoT automation device displayed in the video data stream, the location of the IoT automation device within the field of view of the IoT video device, and/or with the IoT automation device itself. Responsive thereto, systems and methods herein can initiate the change the state of the IoT automation device in the region.

FIG. 1 is a block diagram of a connected home system 100 in accordance with disclosed embodiments. As seen in FIG. 1, the connected home system 100 can include an IoT video device 102 monitoring a region R in which an IoT automation device 106 is installed, and the IoT automation device 106 can be located within a field of view 104 of the IoT video device 102. The IoT video device 102 can capture a video data stream 112 of the region R within the field of view 104, and the video data stream can include a depiction 114 of the IoT automation device 106.

The IoT video device 102 or another device of the connected home system 100, such as a control panel, a gateway device, or the like, can wirelessly transmit the video data stream 112 to a remote server or device 120 that is in wireless communication with the connected home system 100, and the remove server or device 102 can receive the video data stream 112 via a transceiver device 122. As seen in FIG. 1, the remote server or device 120 can also include a memory device 126, and each of the transceiver device 122 and the memory device 126 can be in communication with control circuitry 124, a programmable processor 124a, and executable control software 124b as would be understood by one of ordinary skill in the art. The executable control software 124b can be stored on a transitory or non-transitory computer readable medium, including, but not limited to local computer memory, RAM, optical storage media, magnetic storage media, flash memory, and the like. In some embodiments, some or all of the control circuitry 124, the programmable processor 124a, and the executable control software 124b can execute and control at least some of the methods disclosed and described above and herein.

As seen in FIG. 1, the IoT automation device 106 can include an emitter 108. To enroll the IoT automation device 106 with the IoT video device 102 for control via the video data stream 112, the IoT video device 102 and/or the remote server or device 120 can instruct the IoT automation device 106 to transmit via the emitter 108 a visual or non-visual signal to the IoT video device 102 that identifies the IoT automation device 106. The IoT video device 102 can capture the visual or non-visual signal and transmit the visual or non-visual signal to the remote server or device 120, and the remote server or device 120 can receive the visual or non-visual signal or a representation thereof via the transceiver device 122. Responsive thereto, the control circuitry 124, the programmable processor 124a, and the executable control software 124b can identify and save in the memory device 126 a location of the IoT automation device 106 within the field of view 104 of the IoT video device 102 and match the location of the IoT automation device 106 within the field of view 104 of the IoT video device 102 with a location for a controlling graphic 116 to be overlaid on a depiction 114 of the IoT automation device 106 displayed in the video data stream 112.

The remote server or device 122 can also be in wireless communication with a user interface device 110. Accordingly, the transceiver device 122 can transmit the video data stream 112 and the controlling graphic 116 to the user interface device 110 with a video instruction signal for the user interface device 110 to overlay the controlling graphic 116 on top of the depiction 114 of the IoT automation device 106 in the video data stream 112 when displaying the video data stream 112 thereon. Responsive thereto, and as seen in FIG. 1, the user interface device 110 can display the video data stream 112 with the depiction 114 of the IoT automation device 114 therein and the controlling graphic 116 overlaid thereon.

In some embodiments, the control circuitry 124, the programmable processor 124a, and the executable control software 124b can transmit the video data stream 112 to the user interface device 110 separately from the controlling graphic 116 and the video instruction signal. For example, in these embodiments, the control circuitry 124, the programmable processor 124a, and the executable control software 124b can transmit the controlling graphic 116 and the video instruction signal to the user interface device 110 responsive to the user interface device 110 displaying the video data stream 112, receiving first user input, and transmitting a first request signal to the remote server device 120 requesting the controlling graphic 116.

In any embodiment, the control circuitry 124, the programmable processor 124a, and the executable control software 124b can retrieve the controlling graphic 116 associated with the IoT automation device 116 and the location for the controlling graphic 116 to be overlaid on the depiction 114 of the IoT automation device 106 displayed in the video data stream 112 from the memory device 126.

When the user interface device 110 is displaying the video data stream 112 with the controlling graphic 116 overlaid on the depiction 114 of the IoT automation device 106, the user interface device 110 can receive second user input identifying the controlling graphic 116 and, responsive thereto, transmit a second request signal to the remote server or device 120. The transceiver device 122 can receive the second request signal, and responsive thereto, the control circuitry 122, the programmable processor 124a, and the executable control software 124b can correlate a touch point of the user interface device 110 receiving the second user input with the location of the controlling graphic 116 overlaying the depiction 114 of the IoT automation device 106 displayed in the video data stream 112, with the location of the IoT automation device 106 within the field of view 104 of the IoT video device 102, and/or with the IoT automation device 106 itself. Then, the control circuitry 122, the programmable processor 124a, and the executable control software 124b can initiate a change of state of the IoT automation device 106, for example, by transmitting an automation instruction signal to the IoT automation device 106 or the another device of the connected home system 100 for the IoT automation device 106 to change its state pursuant to the second user input. Because the IoT video device 102 can capture the video data stream 112 of the region R within the field of view 104, including the IoT automation device 106, the video data stream 112 can capture the IoT automation device 106 with the state changed for display on the user interface device 112, thereby providing visual confirmation for a user regarding the state of the IoT automation device 106 being changed.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
   instructing an IoT automation device to transmit a visual signal from an emitter of the IoT automation device;
   receiving, at an IoT video device, the visual signal the from an emitter of the IoT automation device, the visual signal identifying the IoT automation device;
   responsive to receiving the visual signal, identifying and saving an actual first location of the IoT automation device within the field of view of the IoT video device based on a location at which the visual signal is emitted from the emitter of the IoT automation device;
   receiving a video data stream from an the IoT video device monitoring a region in which the IoT automation device is located within a field of view of the IoT video device;
   displaying the video data stream on a display of a user interface device;
   matching the actual location of the IoT automation device within the field of view of the IoT video device with a first location on the display of the user interface device;
   overlaying, for a predetermined period of time, a controlling graphic at the first location on the display of the user interface device that is on top of a depiction of the IoT automation device in the video data stream displayed on the display of the user interface device;
   receiving first user input at a touch point on the video data stream displayed on the display of the user interface device;
   determining whether the touchpoint on the video data stream is correlated with the first location of the controlling graphic overlaying the video data stream on the display of the user interface device;
   responsive to the touchpoint being correlated with the first location on the display of the user interface device, initiating a change of state of the IoT automation device in the region; and
   responsive to initiating the change of state of the IoT automat ion device, removing the controlling graphic from the display of the user interface device and displaying the video data stream on the display of the user interface device with the depiction of the IoT automation device showing the state changed in the video data stream.

2. The method of claim 1 further comprising:
   receiving second user input requesting the controlling graphic via the video data stream displayed on the display of the user interface device; and
   responsive to the second user input, overlaying the controlling graphic at the first location on the display of the user interface device.

3. The method of claim 1 further comprising:
   responsive to receiving second user input at the first location on the display of the user interface device, displaying details for a controlling graphic at the first location on the display of the user interface device;
   receiving the first user input at the touchpoint on the display of the user interface device while the details for the controlling graphic are displayed, the first user input adjusting one of the details for the controlling graphic; and
   responsive to the first user input, initiating the change of the state of the IoT automation device in the region by initiating an adjustment of the IoT automation device in the region that corresponds to the one of the details as adjusted.

4. A system comprising:
   an IoT video device monitoring a region;
   an IoT automation device located in the region within a field of view of the IoT video device, the IoT automation device including an emitter;
   a remote server or device in wireless communication with the IoT video device and the IoT automation device; and
   a user interface device in communication with the remote server or device, wherein the remote server or user interface device instructs the IoT automation device to transmit a visual signal from the emitter of the IoT automation device,
   wherein the visual signal identifies the IoT automation device wherein the IoT video device receives the visual signal and transmits the visual signal to the remote server or user interface device,
   wherein, in response to receiving the visual signal, the remote server or user interface device identifies and saves an actual first location of the IoT automation device within the field of view of the IoT video device based on a location at which the visual signal is emitted from the emitter of the IoT automation device,
   wherein the IoT video device captures a video data stream of the field of view and transmits the video data stream to the remote server or device,
   wherein the remote server or device transmits the video data stream to the user interface device,
   wherein the user interface device displays the video data stream on a display of the user interface device,
   wherein the remote server or device matches the actual location of the IoT automation device within the field of view of the IoT video device with a first location on the display of the user interface device,
   wherein the remote server or device overlays, for a predetermined period of time, a controlling graphic at the first location on the display of the user interface device that is on top of a depiction of the IoT automation device in the video data stream displayed on the display of the user interface device,
   wherein the user interface device receives first user input at a touch point on the video data stream displayed on f the display of the user interface device,
   wherein the user interface device determines whether the touchpoint on the video data stream is correlated with the first location of the controlling graphic overlaying the video data stream on the display of the user interface device, wherein, responsive to the touchpoint being correlated with the first location on the display of the user interface device, the remote server or device initiates a change of state of the IoT automation device in the region, and wherein, responsive to initiating the change of state of the IoT automation device in the region, the remote server or device removes the controlling graphic from the display of the device and displays the video data stream on the display of the device with the depiction of the IoT automation device showing the state changed in the video data stream.

5. The system of claim 4 wherein the user interface device receives second user input requesting the controlling graphic via the video data stream displayed on the display of the user interface device, and wherein, responsive to the second user input, the remote server or device overlays the controlling graphic on top of the depiction of the automation device in the video data stream displayed on the display of the user interface device.

6. The system of claim 4 wherein, responsive to receiving first user input at the first location on the display of the user interface device, the remote server or device displays details for a controlling graphic at the first location on the display of the user interface device, wherein the user interface device receives the first user input at the touchpoint on the display of the user interface device and second user input adjusts one of the details for the controlling graphic, and wherein, responsive to the second user input, the remote server or device initiates the change of the state of the IoT device in the region by initiating an adjustment of the IoT automation device in the region that corresponds to the one of the details as adjusted.

* * * * *